(No Model.)  2 Sheets—Sheet 1.

G. G. CROSBY.
DISINFECTING DEVICE.

No. 509,426. Patented Nov. 28, 1893.

Witnesses:—
D. N. Haywood
J. Dela Mar

Inventor:—
George G. Crosby
by his Atty.
W. L. Bennem

THE NATIONAL LITHOGRAPHING COMPANY,
WASHINGTON, D. C.

(No Model.) 2 Sheets—Sheet 2.

G. G. CROSBY.
DISINFECTING DEVICE.

No. 509,426. Patented Nov. 28, 1893.

Witnesses:-
D. H. Hayward
J. Dela Mar

Inventor:-
George G. Crosby
by his Atty.
W. L. Benners

UNITED STATES PATENT OFFICE.

GEORGE G. CROSBY, OF NEW YORK, N. Y., ASSIGNOR TO THE ELECTRIC DISINFECTANT COMPANY, OF SAME PLACE.

DISINFECTING DEVICE.

SPECIFICATION forming part of Letters Patent No. 509,426, dated November 28, 1893.

Application filed March 27, 1893. Serial No. 467,695. (No model.)

*To all whom it may concern:*

Be it known that I, GEORGE G. CROSBY, of the city, county, and State of New York, have invented certain new and useful Improvements in Disinfecting Devices, of which the following is a specification.

This invention relates to devices for distributing disinfectants, the object being to provide an efficient, durable and portable device of this character, and the invention consists in a receptacle for a disinfectant and means for forcing a current of air through the same and subsequently ejecting the impregnated air.

While I have stated my invention for use with a disinfectant, it is to be understood that it may be put to other uses, such, for instance, as ejecting perfumed air.

My invention may be used in a number of places, such as sick rooms, hospitals, &c., and as it may be conveniently packed in a traveling case, it may be used by a traveler in a hotel room to disinfect the air arising from stationary wash-basins, or similar places.

Figure 1:
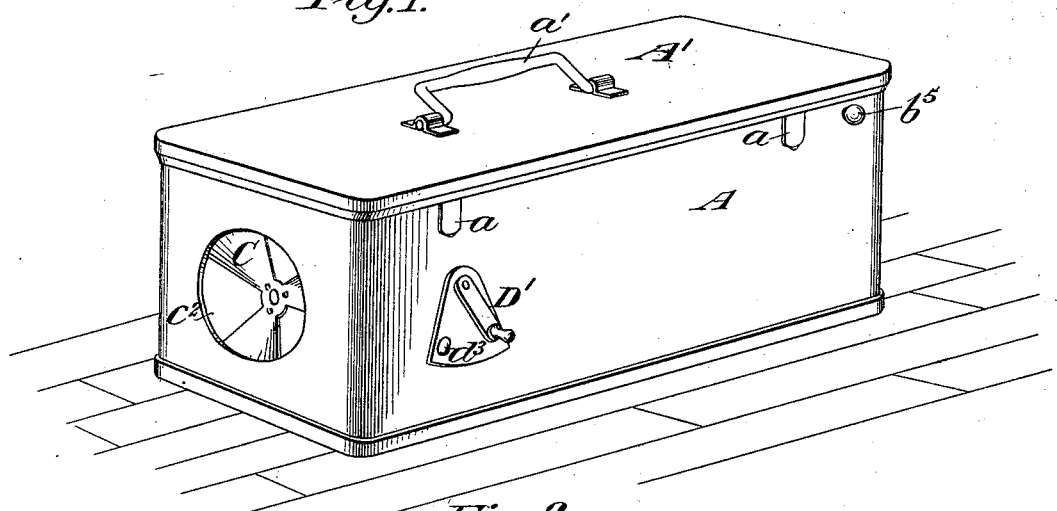
Figure 2:
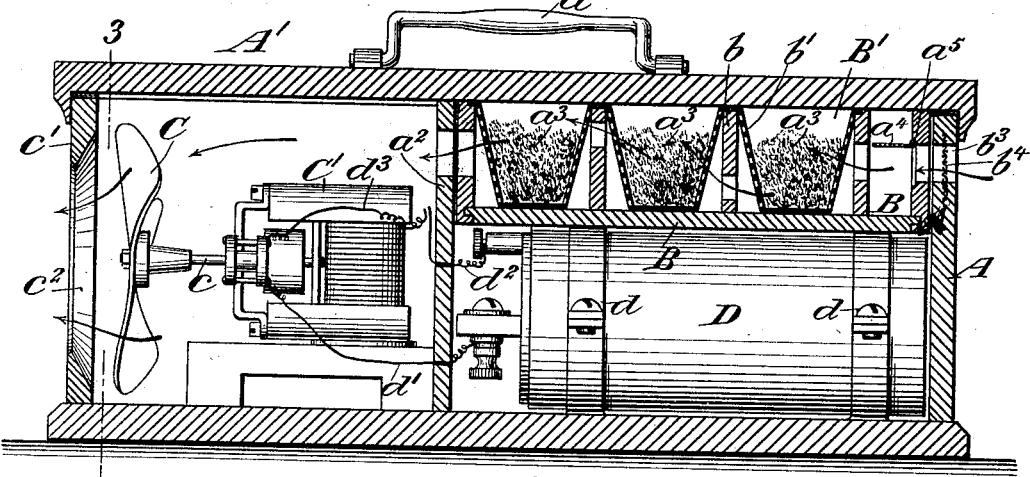
Figure 3:
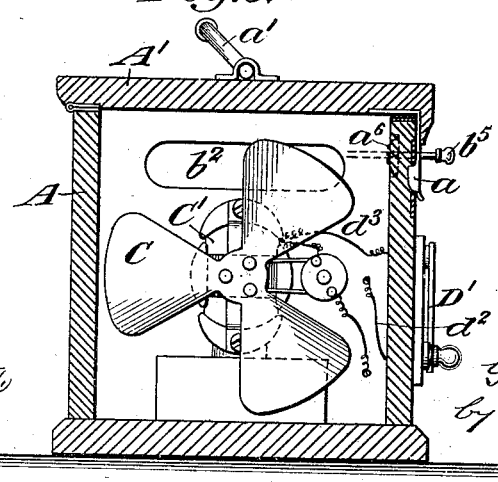
Figure 4:
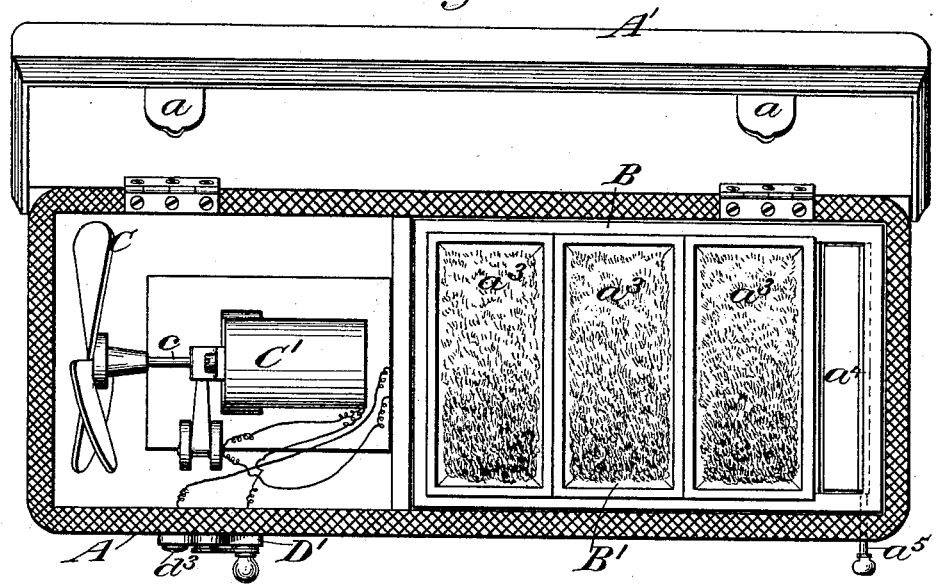
Figure 5:
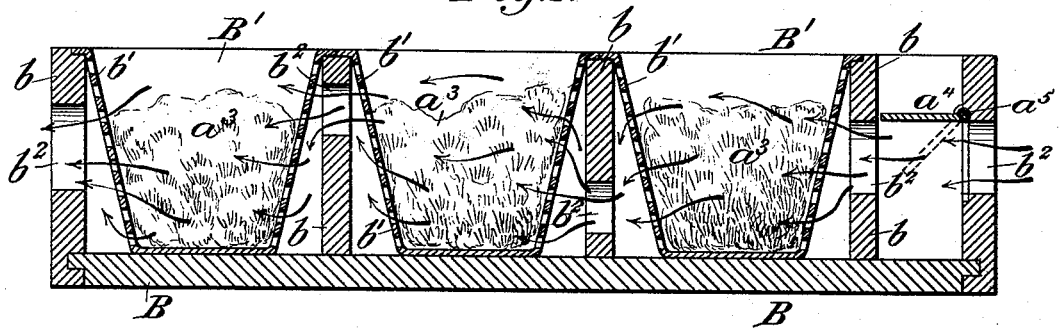
Figure 6:
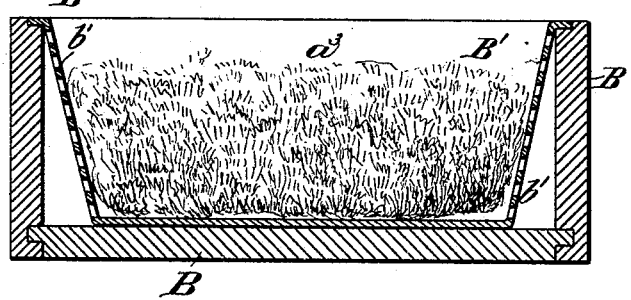

In the accompanying drawings, Figure 1, is a perspective view of a disinfecting device embodying my improvement. Fig. 2, is a longitudinal vertical section thereof. Fig. 3, is a transverse vertical section on the line 3, 3, of Fig. 2. Fig. 4, is a top plan view with the cover of the casing open. Fig. 5, is a longitudinal vertical section of a tray for containing disinfecting material. Fig. 6, is a transverse section thereof.

Referring by letter to the drawings, A, designates a casing having a hinged cover A', provided with fastening clasps or similar devices $a$, and with a handle $a'$, by means of which the device may be carried in the hands.

B, is a tray for receiving sub-trays B', which contain the disinfectant. I have shown three of the sub-trays B', and the tray B, as provided with partitions $b$, but a greater or less number of sub-trays may be employed and the partitions $b$, may be omitted without departing from the spirit of my invention. The side walls $b'$, of the sub-trays are perforated and are inclined downward and inward, as shown, so that air may circulate freely. The partitions $b$, are provided with openings $b^2$, and the end walls of the tray are also provided with openings; the opening in one end wall registers with an opening or inlet $b^3$, in one end wall of the casing A, and the opening in the other end wall of the sub-tray registers with an opening in a partition $a^2$, in the casing A. The openings in the partitions $b$, are preferably arranged in a zigzag row, as shown. The sub-trays contain an absorbent material $a^3$, such as sponge or cotton, which may be saturated with any desired disinfectant.

To prevent the entrance of dust or dirt through the inlet $b^3$, I may provide it with a screen $b^4$, and the entrance of the air draft may be regulated by more or less opening the damper $a^4$, having connection with a rod $a^5$, hung in suitable bearings within the tray B, and having an outwardly projecting hand piece $b^5$. The damper may be retained at any desired angle by a retaining device, here shown as a spring plate $a^6$.

I will now describe a means for forcing air through the disinfecting material and ejecting the same. C, designates a suction fan and blower which may be rotated by any desired means. I have here shown an electro-motor C', firmly secured within the casing A. The fan C, is mounted on the shaft $c$, of the electro-motor, and is located near the inner side of the end wall $c'$, of the casing A, and this wall is provided with an outlet opening $c^2$. A source of electricity, here shown as a battery D, is located in the casing A, beneath the tray B, and is secured in place by means of tie bands $d$. From one element of the battery a wire $d'$, extends to a brush of the electro-motor, and a wire $d^2$, extends from the other element of the battery to an exterior switch D'. From one contact of the switch a wire $d^3$, extends to the other brush of the electro-motor. By means of the switch D', the electric current may be turned on at will to set the fan C, in operation, and the fan may be kept in operation for any desired length of time.

In operation the device is placed in any desired position, the damper $a^4$, regulated and the current turned on. Outer air will be drawn forcibly through the disinfecting material and forcibly ejected through the outlet $c^2$.

Having described my invention, what I claim is—

1. In a disinfecting device, the combination of a casing having inlet and outlet openings, a partition dividing said casing into two compartments, an air current producing device comprising an electro-motor in one of said compartments, a tray removably arranged in the other of said compartments and having perforated end walls, sub-trays in said tray and having perforated side walls, and a battery for the electro-motor secured within the casing below the tray, substantially as specified.

2. In a disinfecting device, the combination with a casing having the inlet and outlet openings, of a tray therein having perforated end walls and perforated partitions, the perforations in the partitions being arranged in a zig-zag line, the perforated sub-trays for disinfecting material and means for forcing air through the device and ejecting it, substantially as specified.

GEORGE G. CROSBY.

Witnesses:
W. H. RICHARDSON,
W. L. BENNEM.